United States Patent
Zhang et al.

(10) Patent No.: US 10,715,269 B2
(45) Date of Patent: Jul. 14, 2020

(54) CHANNEL FREQUENCY SPREADING DEVICE AND METHOD FOR CDMA SYSTEM, AND MOBILE COMMUNICATION SYSTEM

(71) Applicant: Xi'an Creation Keji Co., Ltd., Xi'an (CN)

(72) Inventors: Weiguo Zhang, Xi'an (CN); Jiawei Yan, Xi'an (CN)

(73) Assignee: XI'AN CREATION KEJI CO., LTD., Xi'an (CN)

( * ) Notice: Subject to any disclaimer, the term of this patent is extended or adjusted under 35 U.S.C. 154(b) by 30 days.

(21) Appl. No.: 16/233,048

(22) Filed: Dec. 26, 2018

(65) Prior Publication Data
US 2019/0222344 A1 Jul. 18, 2019

Related U.S. Application Data

(63) Continuation of application No. PCT/CN2018/113802, filed on Nov. 2, 2018.

(30) Foreign Application Priority Data

Dec. 27, 2017 (CN) .......................... 2017 1 1448149
Dec. 27, 2017 (CN) .......................... 2017 1 1449702

(51) Int. Cl.
  *H04J 13/20* (2011.01)
  *H04J 13/18* (2011.01)
  (Continued)

(52) U.S. Cl.
  CPC .......... *H04J 13/20* (2013.01); *H04J 13/0074* (2013.01); *H04J 13/0077* (2013.01); *H04J 13/12* (2013.01);
  (Continued)

(58) Field of Classification Search
  CPC .. H04J 13/18; H04J 13/20; H04J 13/12; H04J 13/0074; H04J 13/0077; H04J 2013/0081; H04L 5/026; H04L 5/0007
  See application file for complete search history.

(56) References Cited

U.S. PATENT DOCUMENTS

| | | | |
|---|---|---|---|
| 5,550,809 A * | 8/1996 | Bottomley | H04B 1/707 370/342 |
| 6,611,494 B1 * | 8/2003 | Ovalekar | H04J 13/004 370/208 |

(Continued)

OTHER PUBLICATIONS

A Whitepaper: "Large Sets of Orthogonal Sequences Suitable for Applications in CDMA Systems" by Zhang et al. Dated: May 17, 2016.*

*Primary Examiner* — Nishant Divecha
(74) *Attorney, Agent, or Firm* — Hemisphere Law, PLLC; Zhigang Ma

(57) ABSTRACT

The present invention discloses a channel frequency spreading device for a CDMA system, including: an orthogonal sequence generating module, configured to generate orthogonal sequence sets; a storage module, connected to the orthogonal sequence generating module, and configured to store the orthogonal sequence sets; a control module, connected to the storage module, and configured to read available orthogonal sequences in the orthogonal sequence sets when receiving a user request control signal; and a channel machine, connected to the control module, and configured to receive user request data, and perform frequency spreading on the user request data according to the available orthogonal sequences and then output. The channel frequency spreading device for a CDMA system can improve the number of the sequences allocated by the cell, and solve the problem that the excessive users cannot communicate normally.

9 Claims, 5 Drawing Sheets

(51) Int. Cl.
*H04L 5/00* (2006.01)
*H04L 5/02* (2006.01)
*H04J 13/00* (2011.01)
*H04J 13/12* (2011.01)

(52) U.S. Cl.
CPC ............ *H04J 13/18* (2013.01); *H04L 5/0007* (2013.01); *H04L 5/026* (2013.01); *H04J 2013/0081* (2013.01)

(56) References Cited

U.S. PATENT DOCUMENTS

| | | | |
|---|---|---|---|
| 6,680,928 B1* | 1/2004 | Dent | H04B 1/707 370/208 |
| 8,004,959 B2* | 8/2011 | Dent | H04J 13/12 370/209 |
| 2006/0126491 A1* | 6/2006 | Ro | H04L 27/2647 370/208 |
| 2007/0287465 A1* | 12/2007 | Hyon | H04W 16/14 455/450 |
| 2009/0129259 A1* | 5/2009 | Malladi | H04B 7/0417 370/210 |
| 2012/0008617 A1* | 1/2012 | Tsai | H04L 5/0016 370/345 |
| 2018/0279294 A1* | 9/2018 | Gao | H04J 13/004 |

\* cited by examiner

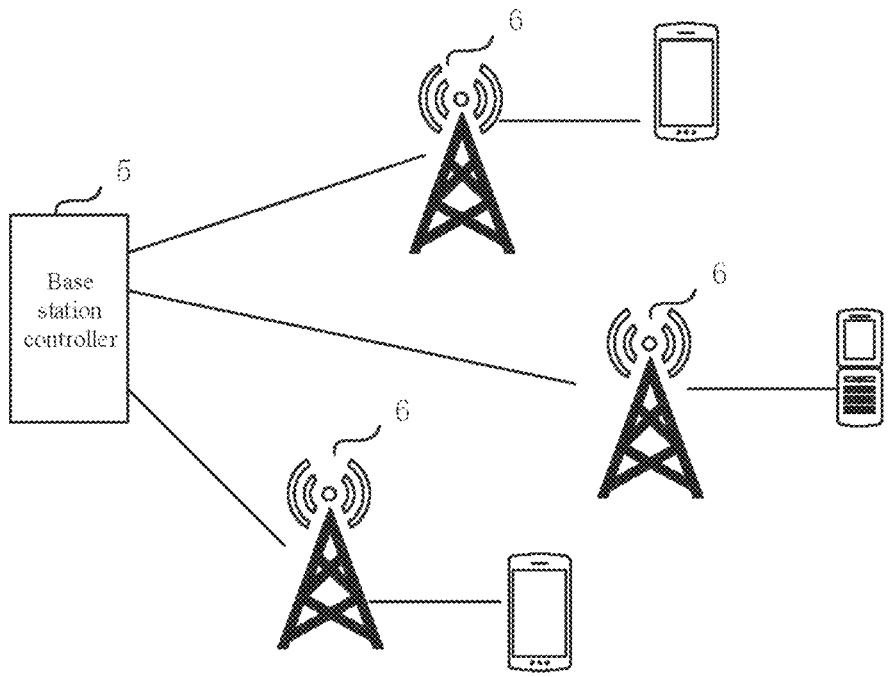

FIG. 6

Selecting an m-input and k-output vector semi-bent function, wherein m and k are positive integers, and m=2k+2

Constructing, by using the vector semi-bent function, $3 \times 2^k$ orthogonal sequence sets, wherein in the orthogonal sequence sets, a number of sequences of each of $2^k$ orthogonal sequence sets is $2^{m-1}$, and a number of sequences of each of $2^{k+1}$ orthogonal sequence sets is $2^{m-1}$

FIG. 7

CHANNEL FREQUENCY SPREADING DEVICE AND METHOD FOR CDMA SYSTEM, AND MOBILE COMMUNICATION SYSTEM

BACKGROUND OF THE INVENTION

1. Field of the Invention

The present invention relates to the field of wireless communication technologies, and in particular to a channel frequency spreading device and method for a CDMA system and a mobile communication system.

2. Description of Related Art

The design of CDMA (Code Division Multiple Access) systems is generally based on the use of $2^m$-long (binary) orthogonal sequences (code words). Even if there are $2^m$ code words in the entire space, it is difficult to find a type of large cardinal sequence subsets of which the sequences are orthogonal to each other. These sequence subsets are randomly allocated to the users of a cell, and a unique sequence is allocated to each user from such subset. As a standard regular hexagonal cellular network, in order to prevent the interference from neighboring cells, a standard requirement is that the sequences in any cell must be orthogonal to the sequences in the neighboring cells. In addition, the correlation values of the sequences within any given cell and the non-neighboring cells should be sufficiently small and within the interval $[2^{m/2}, 2^{(m+2)/2}]$. One of the most common methods of constructing a frequency spreading code sequence in these systems is to utilize a Hadamard matrix set with limited correlation values.

In one configuration in the prior art, referring to "W.-G. Zhang, C.-L. Xie, and E. Pasalic, *Large Sets of Orthogonal Sequences Suitable for Applications in CDMA Systems,*" IEEE Transactions on Information Theory, vol. 62, no. 6, pp. 3757-3767, June 2016, such method generates a large type of sequence sets consisting of a series of sequences orthogonal to each other (in each set). Most sequence sets are also orthogonal to each other. The method firstly covers the parity of m, and secondly avoids such a difficult combination problem of allocating the orthogonal sequence sets to the same cell and guaranteeing the orthogonality of neighboring cells. The implemented number of the users per cell is $2^{m-2}$. However, the number of sequences allocated by the cell and obtained by the constructing method of the prior art is relatively small, the interference between the cells is stronger, and normal communication by a larger number of users cannot be satisfied.

SUMMARY OF THE INVENTION

In order to solve the above problems in the prior art, the present invention provides a channel frequency spreading device and method for a CDMA system and a mobile communication system, which are capable of improving user capacity and have strong anti-interference ability.

A channel frequency spreading device for a CDMA system, includes an orthogonal sequence generating module, configured (i.e., structured and arranged) to generate an orthogonal sequence sets; a storage module, connected to the orthogonal sequence generating module, and configured to store the orthogonal sequence sets; a control module, connected to the storage module, and configured to read available orthogonal sequences in the stored orthogonal sequence sets when receiving a user request control signal; and a channel machine, connected to the control module, and configured to receive user request data, and perform frequency spreading on the user request data according to the available orthogonal sequences and then output.

In an embodiment, the orthogonal sequence generating module includes a vector semi-bent generating unit, an orthogonal sequence set constructing unit, and an orthogonal sequence set allocating unit. The vector semi-bent generating unit is configured to select an m-input and k-output vector semi-bent function. The orthogonal sequence set constructing unit is configured to construct $3 \times 2^k$ orthogonal sequence sets by using the vector semi-bent function, such that in the orthogonal sequence sets, a number of sequences of each of $2^k$ orthogonal sequence sets is $2^{m-1}$, and a number of sequences of each of $2^{k+1}$ orthogonal sequence sets is $2^{m-2}$. The orthogonal sequence set allocating unit is configured to arrange cells for the orthogonal sequence sets according to a predetermined method, so that sequences in each of the cells are orthogonal with one another, and sequence sets of neighboring ones of the cells are orthogonal with each other. m and k are both positive integers and m=2k+2.

In an embodiment, an orthogonal multiplexing distance of the neighboring ones of the cells is $\sqrt{21}$.

In an embodiment, the orthogonal sequence set constructing unit further includes a semi-bent function generating subunit, a Hadamard matrix generating subunit, and an orthogonal sequence set generating subunit. The semi-bent function generating subunit is configured to obtain $2^k$ semi-bent functions according to the vector semi-bent function. The Hadamard matrix generating subunit is configured to select a $2^m \times 2^m$ dimensional Hadamard matrix and divide the Hadamard matrix into a first subsequence set, a second subsequence set, and a third subsequence set, wherein a number of sequences of the first subsequence set is $2^{m-1}$, and a number of sequences of each of the second subsequence set and the third subsequence set is $2^{m-2}$. The orthogonal sequence set generating subunit is configured to multiply corresponding bits of each of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of each of the third orthogonal sequence sets is $2^{m-2}$.

A channel frequency spreading method for a CDMA system, including: S1, generating orthogonal sequence sets; S2, storing the orthogonal sequence sets; S3, reading available orthogonal sequences in the stored orthogonal sequence sets when a user request control signal is received; and S4, receiving user request data, and performing frequency spreading on the user request data according to the available orthogonal sequences and then outputting.

In an embodiment, the step S1 further includes: S11, selecting an m-input and k-output vector semi-bent function, where m and k are positive integers, and m=2k+2; S12, constructing, by using the vector semi-bent function, $3 \times 2^k$ orthogonal sequence sets, wherein in the orthogonal sequence sets, a number of sequences of each of $2^k$ orthogonal sequence sets is $2^{m-1}$, and a number of sequences of each of $2^{k+1}$ orthogonal sequence sets is $2^{m-2}$; and S13, arranging cells for the orthogonal sequence sets according to a predetermined rule, so that sequences in each of the cells are orthogonal with one another, and sequence sets of neighboring ones of the cells are orthogonal with each other.

In an embodiment, the step S12 further includes: S121, obtaining $2^k$ semi-bent functions according to the vector semi-bent function; S122, selecting a $2^m \times 2^m$ dimensional Hadamard matrix and dividing the Hadamard matrix into a first subsequence set, a second subsequence set, and a third subsequence set, wherein a number of sequences of the first subsequence set is $2^{m-1}$, and a number of sequences of each of the second subsequence set and the third subsequence set is $2^{m-2}$; and S123, multiplying corresponding bits of each of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of sequences of each of the third orthogonal sequence sets is $2^{m-2}$.

In an embodiment, an orthogonal multiplexing distance of neighboring ones of the cells is $\sqrt{21}$.

A mobile communication system, including: a base station controller, configured for generating orthogonal sequences, and allocating orthogonal sequence resources to base stations in a cellular network according to a predetermined method; and a plurality of base stations, arranged to form the cellular network and configured for allocating channels according to the orthogonal sequence resources, and sending communication data by the channels.

In an embodiment, the base station includes: a base station transceiver and an antenna, wherein the transceiver is configured for converting the communication data into a radio frequency signal and then sending out by the antenna or for converting a radio frequency signal received by the antenna into communication data.

In an embodiment, the base station controller configured for generating orthogonal sequences is concretely configured for: selecting an m-input and k-output vector semi-bent function, where m and k are positive integers, and m=2k+2; and constructing, by using the vector semi-bent function, $3 \times 2^k$ orthogonal sequence sets, wherein in the orthogonal sequence sets, a number of sequences of each of $2^k$ orthogonal sequence sets is $2^{m-1}$, and a number of sequences of each of $2^{k+1}$ orthogonal sequence sets is $2^{m-2}$.

In an embodiment, constructing, by using the vector semi-bent function, $3 \times 2^k$ orthogonal sequence sets includes: obtaining $2^k$ semi-bent functions according to the vector semi-bent function; selecting a $2^m \times 2^m$ dimensional Hadamard matrix and dividing the Hadamard matrix into a first subsequence set, a second subsequence set, and a third subsequence set, wherein a number of sequences of the first subsequence set is $2^{m-1}$, and a number of sequences of each of the second subsequence set and the third subsequence set is $2^{m-2}$; and multiplying corresponding bits of each of the $2^k$ semi-bent functions by corresponding bits of the first subsequence set, corresponding bits of the second subsequence set, and corresponding bits of the third subsequence sets individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of sequences of each of the third orthogonal sequence sets is $2^{m-2}$.

In an embodiment, the predetermined method comprises: causing sequences in each of the cells to be orthogonal with one another, and sequence sets of neighboring ones of the cells to be orthogonal with each other.

In an embodiment, an orthogonal multiplexing distance of the neighboring ones of the cells is $\sqrt{21}$.

The channel frequency spreading device/method for a CDMA system according to the present invention selects specific input and output, and constructs a corresponding number of orthogonal sequence sets by using a semi-bent function, so as to improve the number of the sequences allocated to the cell, and solve the problem that the excessive users cannot communicate normally.

BRIEF DESCRIPTION OF THE DRAWINGS

FIG. 6 is a block diagram of modules of a mobile communication system according to an embodiment of the present invention.

FIG. 7 is a flowchart of generating an orthogonal sequence according to an embodiment of the present invention.

DETAILED DESCRIPTION OF PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Embodiment 1

Figure 1:
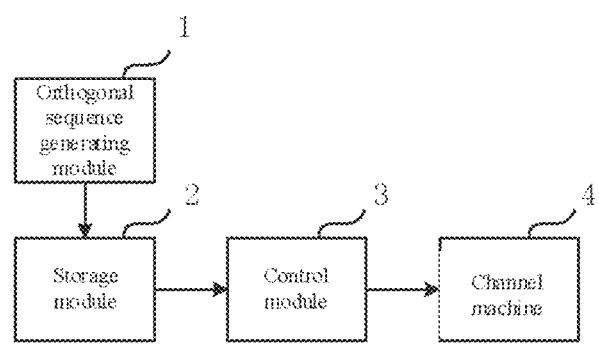
FIG. 1 is a block diagram of modules of a channel frequency spreading device for a CDMA system according to an embodiment of the present invention.

Referring to FIG. 1, FIG. 1 is a block diagram of modules of a channel frequency spreading device for a CDMA system according to an embodiment of the present invention, which includes: an orthogonal sequence generating module 1, configured to generate orthogonal sequence sets; a storage module 2, connected to the orthogonal sequence generating module 1, configured to store the orthogonal sequence sets; a control module 3, connected to the storage module 2, and configured to read available orthogonal sequences in the orthogonal sequence sets when receiving a user request control signal; and a channel machine 4, connected to the control module 3, and configured to receive user request data, and perform frequency spreading on the user request data according to the available orthogonal sequences and then output.

Figure 2:
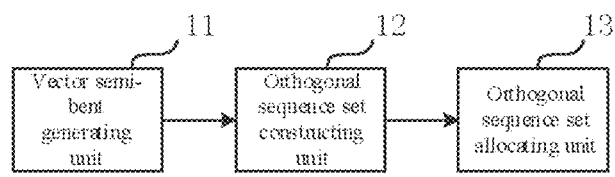
FIG. 2 is a block diagram of an orthogonal sequence generating module of a channel frequency spreading device for a CDMA system according to an embodiment of the present invention.

In a specific embodiment, referring to FIG. 2, FIG. 2 is a block diagram of an orthogonal sequence generating module of a channel frequency spreading device for a CDMA system according to an embodiment of the present invention. The orthogonal sequence generating module 1 includes a vector semi-bent generating unit 11, an orthogonal sequence set constructing unit 12, and an orthogonal sequence set allocating unit 13.

The vector semi-bent generating unit 11 is configured to select an m-input and k-output vector semi-bent function.

The orthogonal sequence set constructing unit 12 is configured to construct $3 \times 2^k$ orthogonal sequence sets by using the vector semi-bent function, such that in the orthogonal sequence sets, the number of sequences of each of $2^k$ orthogonal sequence sets is $2^{m-1}$, and the number of sequences of each of $2^{k+1}$ orthogonal sequence sets is $2^{m-2}$.

The orthogonal sequence set allocating unit 13 is configured to arrange cells for the orthogonal sequence sets according to a predetermined algorithm/method, so that the sequences in each of the cells are orthogonal with one another, and the sequence sets of neighboring cells are orthogonal with each other.

m and k are both positive integers and m=2k+2

In a specific embodiment, an orthogonal multiplexing distance of the neighboring cells $\sqrt{2I}$.

In a specific embodiment, the orthogonal sequence set constructing unit further includes: a semi-bent function generating subunit, a Hadamard matrix generating subunit, and an orthogonal sequence set generating subunit.

The semi-bent function generating subunit is configured to obtain $2^k$ semi-bent functions according to the vector semi-bent function.

The Hadamard matrix generating subunit is configured to select a $2^m \times 2^m$ dimensional Hadamard matrix and divide the Hadamard matrix into a first subsequence set, a second subsequence set, and a third subsequence set, wherein the number of sequences of the first subsequence set is $2^{m-1}$, and the number of sequences of each of the second subsequence set and the third subsequence set is $2^{m-2}$.

The orthogonal sequence set generating subunit is configured to multiply corresponding bits of the $2^k$ semi-bent functions by corresponding bits of the first subsequence set, corresponding bits of the second subsequence set, and corresponding bits of the third subsequence sets individually to obtain $2^k$ first orthogonal sequence sets, $2^k$ second orthogonal sequence sets, and $2^k$ third orthogonal sequence sets, wherein the number of sequences of each of the first orthogonal sequence sets is $2^{m-1}$, and the number of sequences of each of the second orthogonal sequence sets as well as the number of sequences of each of the third orthogonal sequence sets is $2^{m-2}$.

The channel frequency spreading device for a CDMA system according to the present invention selects specific input and output, and constructs a corresponding number of orthogonal sequence sets by using a semi-bent function, so as to improve the number of the sequences allocated to the cell, and solve the problem that the excessive users cannot communicate normally.

Embodiment 2

Figure 3:
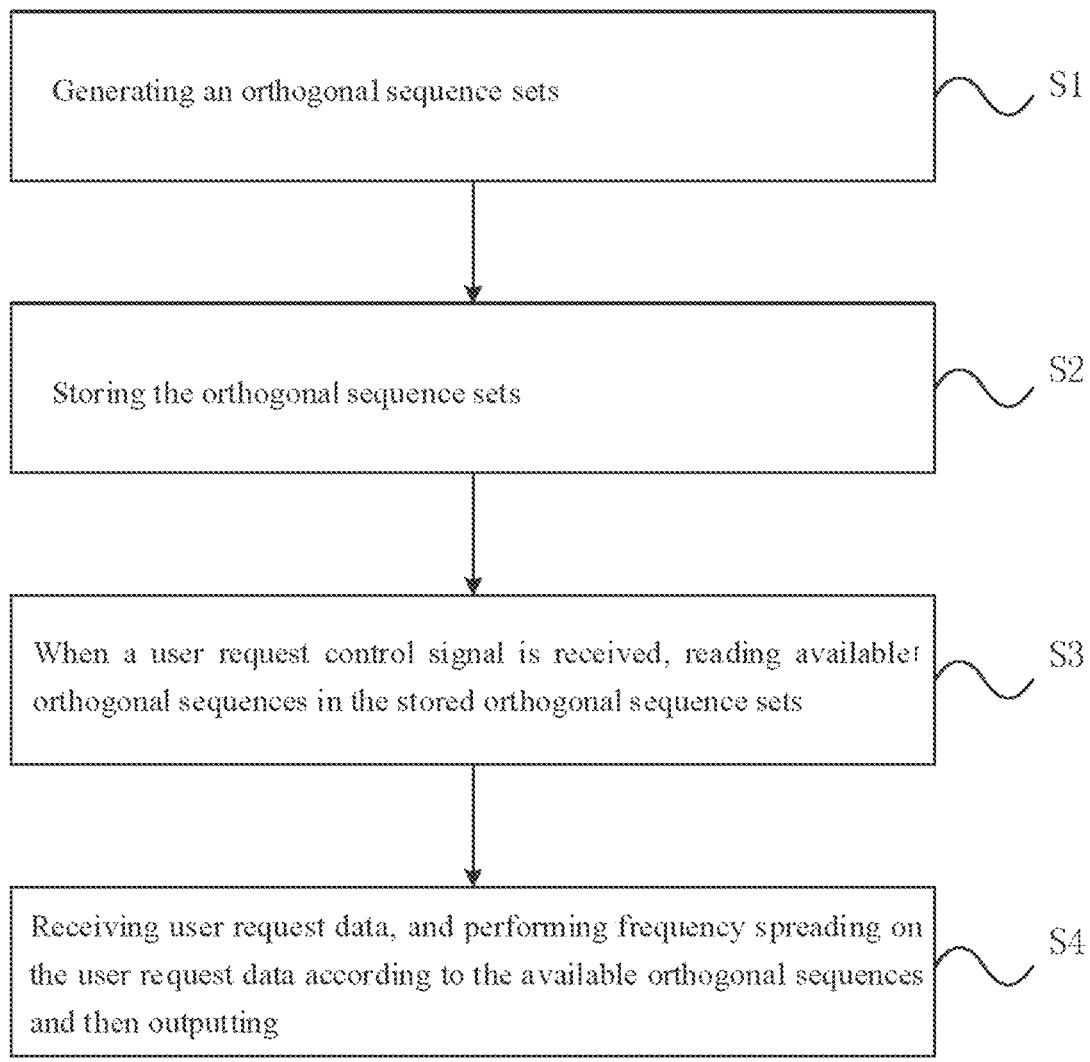
FIG. 3 is a flowchart of a channel frequency spreading method for a CDMA system according to an embodiment of the present invention.

Referring to FIG. 3, FIG. 3 is a flowchart of a channel frequency spreading method for a CDMA system according to an embodiment of the present invention, which includes:

S1, generating orthogonal sequence sets; S2, storing the orthogonal sequence sets; S3, when a user request control signal is received, reading available orthogonal sequences in the stored orthogonal sequence sets; and S4, receiving user request data, and performing frequency spreading on the user request data according to the available orthogonal sequences and then outputting.

In order to better illustrate the method provided by the present invention, the technical background of the present invention will be firstly described as follows. At first, some concepts and tools related to a Boolean function and the sequence will be introduced.

$F_2^m$ is set to an m-dimensional vector space, $F_{2^m}$ is a finite field on GF(2), then the m-elementary Boolean function $f(x)$ is represented as a mapping of some $F_2^m$ to $F_2$. Herein, $x=(x_1, \ldots, x_m) \in F_2^m$. $B_m$ is set to represent a set of all m-elementary Boolean functions. The present invention replaces the addition operation in $F_2^m$ and $F_{2^m}$ with "+" and $\Sigma_i$. Any Boolean function $f \in B_m$ can be represented by its algebraic regular type:

$$f(x_1, \ldots, x_m) = \sum_{b \in F_2^m} \lambda_b \left( \prod_{i=1}^m x_i^{b_i} \right), \quad (1)$$

wherein $\lambda_b \in F_2$, $b=(b_1, \ldots, b_m) \in F_2^m$. The algebra degree of $f(x)$ is the minimum value of wt(b) enabling $\lambda_b \neq 0$, and is recorded as deg(f), wherein wt(b) is the Hamming weight of b. When deg($f$)=1, $f$ is called an affine function.

For $a=(a_1, \ldots, a_m) \in F_2^m$, $b=(b_1, \ldots, b_m) \in F_2^m$. Then the inner product of a and b is defined as:

$$a \cdot b = \sum_{i=1}^m a_i b_i, \quad (2)$$

wherein the addition is mod 2 operation.

Any linear function on $F_2^m$ can be defined by an inner product $\omega \cdot x$, wherein $\omega=(\omega_1, \ldots, \omega_m)$, $x=(x_1, \ldots, x_m) \in F_2^m$. Each $\omega$ distinguishes different linear functions. A set containing all m-elementary linear functions is defined as $L_m$, thus $L_m = \{\omega \cdot x | \omega \in F_2^m\}$.

$B_m$ is set to represent a set of all m-elementary Boolean functions. For any $f \in B_m$, the Walsh spectrum thereof is defined as follows:

$$W_f(\omega) = \sum_{x \in F_2^m} (-1)^{f(x)+\omega \cdot x}. \quad (3)$$

supp($f$)={$x \in F_2^m | f(x)=1$} is defined as a support set for the function $f$. If the numbers of 0 and 1 in the truth table of the m-elementary function $f \in B_m$ are equal, it is called the balance function, i.e., # supp($f$)=$2^{m-1}$ or: $W_f(0_m)=0$ (4), wherein $0_m$ represents an m-long 0 vector.

The sequence of function $f \in B_m$ is a N=$^m$-long (1,−1) sequence, and defined as: $\bar{f}=((-1)^{f(0, \ldots, 0,0)}, (-1)^{f(0, \ldots, 0,1)}, \ldots, (-1)^{f(1, \ldots, 1,1)})$(5).

The inner product of vectors $\bar{f}_1=(u_1, \ldots, u_N)$ and $\bar{f}_2=(v_1, \ldots, v_N)$ is expressed as $\bar{f}_1, \bar{f}_2$, defined as $$\bar{f}_1 \cdot \bar{f}_2 = \sum_{i=1}^{N} u_i v_i. \quad (6)$$

Thus it can be obtained that $W_f(\omega) = \bar{f} \cdot \bar{l}$, wherein $l = \omega \cdot x$.
A $2^m \times 2^m$ Hadamard matrix $H_m$ is defined as: $H_0 = (1)$, $$H_m = \begin{pmatrix} H_{m-1} & H_{m-1} \\ H_{m-1} & -H_{m-1} \end{pmatrix},$$

$m = 1, 2, \ldots$ (7).

$r_j$, $0 \leq j \leq 2^m - 1$ is set to the jth column of $H_m$, then $r_j$ is a linear sequence, i.e., the set $H = \{r_j | 0 \leq j \leq 2^m - 1\}$ (8) is a Hadamard sequence set, $H = \{\bar{l} | l \in L_m\}$ (9).

According to the above solution, the present invention gives the following definitions.

Definition 1: $f_1, f_2 \in B_m$ is set. If $$\bar{f}_1 \cdot \bar{f}_2 = \sum_{x \in F_2^m} (-1)^{f_1(x) + f_2(x)} = 0 \quad (10)$$

is satisfied, $\bar{f}_1$ and $\bar{f}_2$ are orthogonal, which is expressed as $\bar{f}_1 \perp \bar{f}_2$.

$S = \{\bar{f}_i | f_i \in B_m, i = 1, 2, \ldots, \kappa\}$ (11) is set.

If $\bar{f}_i$ of the set S are orthogonal pairwise, S is called the orthogonal sequence set with the base $\mathcal{K}$. $S_1$ and $S_2$ are set to orthogonal sequence sets, for any $\bar{f}_1 \in S$, $\bar{f}_2 \in S$, $\bar{f}_1 \cdot \bar{f}_2 = 0$ always, then, $S_1$ and $S_2$ are called to be orthogonal, which is expressed as $S_1 \perp S_2$.

The invention derives the following properties of the orthogonal sequence.

Lemma 1: $f_1, f_2 \in B_m$ is set. Then $\bar{f}_1 \perp \bar{f}_2$ if and only if $W_{f_1 + f_2}(0_m) = 0$.

For any two different linear functions $l, l' \in L_m$, $W_{l+l'}(0_m) = 0$, then $\bar{l} \perp \bar{l'}$ is always true, that is, H is an orthogonal sequence set.

Definition 2: if for any $\alpha \in F_2^m$, $W_f(\alpha) \in \{0, \pm 2^\lambda\}$, wherein $\lambda \geq m/2$ is a positive integer, then such function is called the Plateaued function. When $\lambda \geq \lfloor (m+2)/2 \rfloor$, the function is called the semi-bent function. If $f$ is a Plateaued function (semi-bent function), $\bar{f}$ is called a Plateaued sequence (semi-bent sequence).

The Maiorana-McFarland type function is defined as follows.

Definition 3: for any positive integer, $m = s + t$, and a Maiorana-McFarland function is defined as: $f(y, x) = \phi(y) \cdot x \oplus g(y)$, $y \in F_2^s$, $x \in F_2^t$ (12), wherein $\phi$ is random mapping of $F_2^s$ to $F_2^t$ and $g \in B_s$.

When $s \leq t$ and $\phi$ is single set, then the Maiorana-McFarland type function is the Plateaued function. In particular, when $s = t$ and $\phi$ is bijective, then the Maiorana-McFarland type of the bent function is obtained.

Definition 4: an m variable-elementary t-dimensional vector function is a mapping function $F: F_2^m \mapsto F_2^t$, or it can also be a t-elementary Boolean function set $F(x) = (f_1, \ldots, f_t)$. If any non-zero linear combination of component functions $f_1, \ldots, f_t$ is a three-value Plateaued Boolean function of which the spectral value is derived from $\{0, \pm 2^\lambda\}$, F is called a vector Plateaued function. When $\lambda = \lfloor (m+2)/2 \rfloor$, F is called the vector semi-bent function. If any non-zero linear combination of component functions $f_1, \ldots, f_t$ is a binary bent function of which the spectral value is derived from $\{\pm 2^{m/2}\}$, then F is called a vector bent function, wherein m is an even number and $t \leq m/2$.

Figure 4:
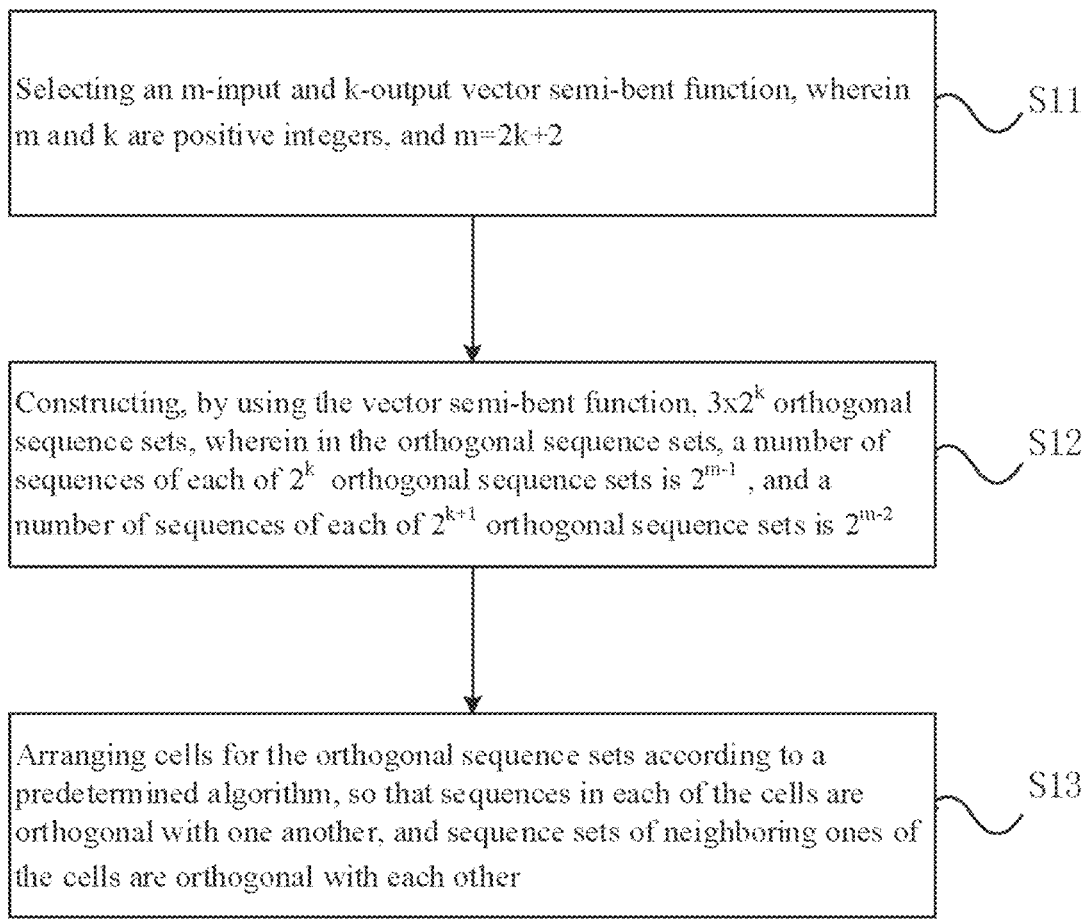
FIG. 4 is a flowchart of a method for generating orthogonal sequence sets according to an embodiment of the present invention.

Based on the above definitions of the present invention, continuing to refer to FIG. 4, FIG. 4 is a flowchart of a method for generating orthogonal sequence sets according to an embodiment of the present invention, which includes: S11, selecting an m-input and k-output vector semi-bent function, wherein m and k are positive integers, and $m = 2k + 2$; S12, constructing, by using the vector semi-bent function, $3 \times 2^k$ orthogonal sequence sets, wherein in the orthogonal sequence sets, the number of sequences of each of $2^k$ orthogonal sequence sets is $2^{m-1}$, and the number of sequences of each of $2^{k+1}$ orthogonal sequence sets is $2^{m-2}$; and S13, arranging cells for the orthogonal sequence sets according to a predetermined algorithm, so that the sequences in each of the cells are orthogonal with one another, and the sequence sets of neighboring cells are orthogonal with each other.

In a specific embodiment, the S12 includes the following steps.

S121, $2^k$ semi-bent functions are obtained according to the vector semi-bent function.

Specifically, in order to increase the number of cell users, m and k are set to two positive integers, $m = 2k + 2$ and $k \geq 2$. $\gamma$ is set to the primitive element of $F_{2^k}$, and $\{1, \gamma, \ldots, \gamma^{k-1}\}$ is a group of polynomial bases of $F_{2^k}$ on $F_2$. Isomorphic mapping $\pi: F_{2^k} \mapsto F_2^k$ is defined, and $\pi(b_1 + b_2 \gamma + \ldots + b_k \gamma^{k-1}) = (b_1, b_2, \ldots, b_k)$ (13).

For $i = 1, \ldots, k$, bijective $\phi_i: F_2^k \to F_2^k$ is defined as:

$$\phi_i(y) = \begin{cases} 0_k, & y = 0_k \\ \pi(\gamma^{[y]+i}), & y \in F_2^{k*} \end{cases}$$

(14).

[y] is defined as integer representation of y.

$y, x \in F_2^k, z \in F_2^2$ is set, for $i = 1, \ldots, k$, define a series of Boolean functions $f_i: F_2^m \to F_2$ is defined, $f_i(y, x, z) = \phi_i(y) \cdot x$ (15).

The vector Boolean function $F: F_2^m \mapsto F_2^k$ is defined as: $F(x) = (f_1, \ldots, f_k)$ (16).

S122, a $2^m \times 2^m$ dimensional Hadamard matrix is selected and the Hadamard matrix is divided into a first subsequence set, a second subsequence set, and a third subsequence set, wherein the number of sequences of the first subsequence set is $2^{m-1}$, and the number of sequences of each of the second subsequence set and the third subsequence set is $2^{m-2}$.

Specifically, for any $c = (c_1, \ldots, c_k) \in F_2^{k*}$, $f_c(y, x, z) = c \cdot F(y, x, z) = c_1 f_1 + \ldots + c_k f_k$ (17) is set.

For any fixed $\delta \in F_2^2$, $L_\delta = \{(\beta, \alpha, \delta) \cdot (y, x, z) | \beta, \alpha \in F_2^k\}$ (18) is defined.

$T_0 = L_{00} \cup L_{11}$, $T_1 = L_{01}$ and $T_2 = L_{10}$ are set.

S123, corresponding bits of the $2^k$ semi-bent functions are multiplied by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein the number of sequences of each of the first orthogonal sequence sets is $2^{m-1}$, and the number of sequences of each of the second orthogonal sequence sets as well as the number of sequences of each of the third orthogonal sequence sets is $2^{m-2}$.

Specifically, $3 \cdot 2^k$ disjoint sequence sets are constructed as follows: $S_{c,i} = \{\bar{f}_c + \bar{l} | l \in T_i\}$, $c \in F_2^k$, $i \in \{0, 1, 2\}$ (19).

The $S_{c,0}$ sequence has $2^{m-1}$ users, and the remaining sequences have $2^{m-2}$ users.

The channel frequency spreading method for a CDMA system according to the present invention selects specific input and output, and constructs a corresponding number of orthogonal sequence sets by using a semi-bent function, so as to improve the number of the sequences allocated to the cell, and solve the problem that the excessive users cannot communicate normally.

In order to more clearly illustrate the constructing process of the present invention, the present invention provides the following proof process.

$m=2k+2$ is set, for any $c \in F_2^k$, $i \in \{0,1,2\}$, the sequence set $S_{c,i}$ is set as defined in equation (19), then: i) for any $c \in F_2^k$, $|S_{c,0}|=2^{m-1}$, and $|S_{c,1}|=|S_{c,2}|=2^{m-2}$; Ii) for any $c \in F_2^{k*}$, $i \in \{0,1,2\}$, and $S_{c,i}$ is an orthogonal semi-bent sequence set; and Iii) for any $c,c' \in F_2^k$, $i,i' \in \{0,1,2\}$, and $S_{c,i} \perp S_{c',i'}$ if and only if $i \neq i'$.

Firstly, it is noted that $|L_\delta|=2^{2k}=2^{m-2}$, indicating that i) is true.

Secondly, for ii), for any $c=(c_1, \ldots, c_k) \in F_2^{k*}$, and $(\beta,\alpha,\delta) \in F_2^k \times F_2^k \times F_2^2$, $$W_{f_c}(\beta, \alpha, \delta) = \sum_{(y,x,z) \in F_2^m} (-1)^{f_c(y,x,z)+\beta \cdot y + \alpha \cdot x + \delta \cdot z} == \quad (20)$$

$$\sum_{z \in F_2^2} (-1)^{\delta \cdot z} \sum_{y \in F_2^k} (-1)^{\beta \cdot y} \sum_{x \in F_2^k} (-1)^{\phi_c(y) \cdot x + \alpha \cdot x},$$

wherein $\phi_c(y) = \sum_{i=1}^{k} c_i \phi_i(y)$.

Due to $$\phi_c(y) = \begin{cases} 0_k, & y = 0_k \\ \pi(\gamma^{[y]+i_c}), & y \in F_2^{k*} \end{cases} \text{ and} \quad (21)$$

$$\phi_c(y) = \begin{cases} 0_k, & y = 0_k \\ \pi(\gamma^{[y]+i_c}), & y \in F_2^{k*} \end{cases}, \quad (22)$$

for $y \in F_2^{k*}$, when $$\pi\left(\sum_{i=1}^{k} c_i \gamma^{[y]+i}\right) = \pi(\gamma^{[y]+i_c})$$

is true, when $\gamma$ is the primitive element of $F_{2^k}$, there exists only one $0 \leq i_c \leq 2^k-2$, so that $\gamma^{i_c}=c \cdot (1, \ldots, \gamma^{k-1})$. It can be known that $\phi_c(y)$ is a permutation of $F_2^k$. Therefore, there exists only one unique $y \in F_2^k$, enabling $\phi_c(y)=\alpha$, which indicates that for any $y \in F_2^k$, $$\sum_{x \in F_2^k} (-1)^{\phi_c(y) \cdot x + \alpha \cdot x} = \begin{cases} \pm 2^k, & \phi_c^{-1}(\alpha) = y \\ 0, & \text{Other} \end{cases}. \quad (23)$$

For any $\beta, \alpha \in F_2^k$, $$\sum_{y \in F_2^k} (-1)^{\beta \cdot y} \sum_{x \in F_2^k} (-1)^{\phi_c(y) \cdot x + \alpha \cdot x} = \pm 2^k. \quad (24)$$

In addition, $$\sum_{z \in F_2^2} (-1)^{\delta \cdot z} = \begin{cases} 4, & \delta = 0 \\ 0, & \text{Other} \end{cases}. \quad (25)$$

For any $c \in F_2^{k*}$, $$W_{f_c}(\beta, \alpha, \delta) = \begin{cases} 0, & \delta \neq 0 \\ \pm 2^{k+2}, & \text{Other} \end{cases}. \quad (26)$$

When $k=(m-2)/2$, F is a vector semi-bent function.

Again, for iii), $\overline{f_c+l} \in S_{c,i}$ and $\overline{f_{c'}+l'} \in S_{c',i'}$ are set, wherein $l \in T_i$, $l' \in T_{i'}$.

In order to analyze the orthogonality between $\overline{f_c+l}$ and $\overline{f_{c'}+l'}$, it is considered that $h=(f_c+l)+(f_{c'}+l')=f_{c+c'}+(l+l')$ (27), wherein $l+l' \in T_i \oplus T_{i'}$.

$$f_c(y, x, z) + f_{c'}(y, x, z) = \sum_{i=1}^{k} (c_i + c_{i'}) \phi(y) \cdot x = f_{c+c'}(y, x, z),$$

so that the equation $f_c + f_{c'} = f_{c+c'}$ can be easily obtained from formula (21).

By equation (26), $W_h(0_m)=0$ if and only if $l+l' \notin L_{00}$. It can be known from Table 1 that $L_{00} \cap (T_i \oplus T_{i'}) = \emptyset$ if and only if $i \neq i'$. This means $S_{c,i} \perp S_{c',i'}$ if and only if $i \neq i'$.

TABLE 1

| operation $\oplus$ of $T_i$, i = 0, 1, 2 | | | |
|---|---|---|---|
| $\oplus$ | $T_0$ | $T_1$ | $T_2$ |
| $T_0$ | $L_{00} \cup L_{11}$ | $L_{01} \cup L_{10}$ | $L_{01} \cup L_{10}$ |
| $T_1$ | $L_{01} \cup L_{10}$ | $L_{00}$ | $L_{11}$ |
| $T_2$ | $L_{01} \cup L_{10}$ | $L_{11}$ | $L_{00}$ |

Embodiment 3

The following example gives the distribution of orthogonal sequence $S_{c,i}$ when $m=8$, and $S_{c,0}$ is equivalent to that the cell has larger user number $2^{m-1}$.

$m=8$ and $k=3$ are set, according to the embodiment 2, $3 \times 2^3 = 24$ disjoint orthogonal semi-bent sequences can be generated, $S_{c,i} = \{\overline{f_c+l} | l \in T_i\}$, $c \in F_2^3$, $i \in \{0,1,2\}$, (28).

Figure 5:
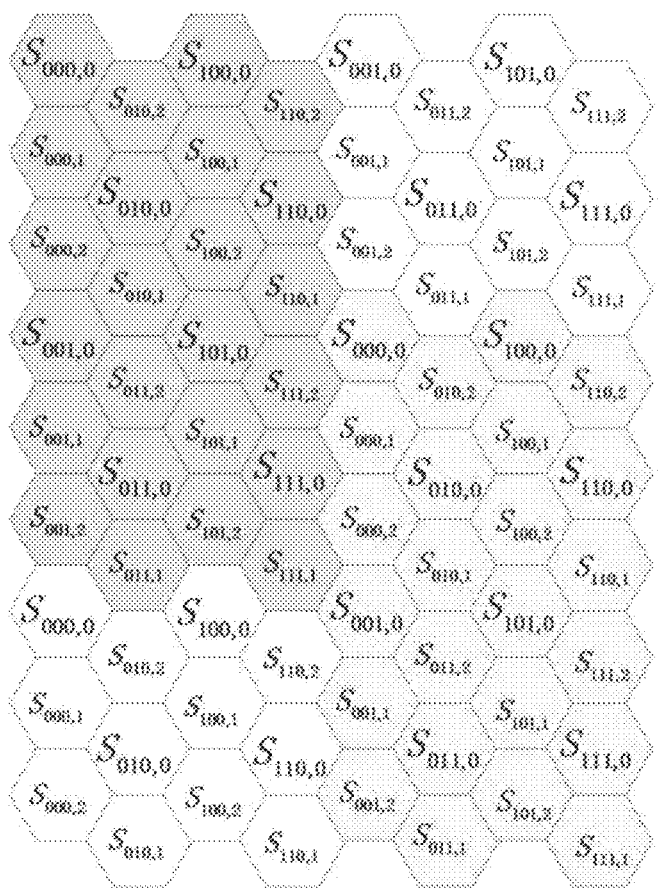
FIG. 5 is an allocation schematic diagram of a regular hexagonal network according to a specific embodiment of the present invention.

The sequence $S_{c,0}$ has $2^{m-1}=128$ users, the remaining sequences have 64 users, and the above sequences are sorted in the cells. Referring to FIG. 5. FIG. 5 is an allocation schematic diagram of a regular hexagonal network according to a specific embodiment of the present invention. According to the distribution in FIG. 5, the reusable distance (also referred to as orthogonal multiplexing distance) is $D = \sqrt{21}$. The cells with $2^{m-1}$ users are marked with a larger font. It is noted that each cell is surrounded by 6 small cells, and each small cell is surrounded by 3 large cells and 3 small cells. In addition, seen from certain column, the two adjacent cells with $2^{m-1}$ users are separated by two cells with $2^{m-2}$ users, which indicates that one third of the cells in the network are large cells with $2^{m-1}$ users. Referring to FIG. 5, for example, $S_{000,0}$ and $S_{001,0}$ in the same column are separated by two cells $S_{000,1}$ and $S_{000,2}$.

The channel frequency spreading device for a CDMA system according to the present invention selects specific input and output, and constructs a corresponding number of orthogonal sequence sets by using a semi-bent function, so as to improve the number of the sequences allocated by the cell, and solve the problem that the excessive users cannot communicate normally.

Embodiment 4

Referring to FIG. 6, FIG. 6 is a block diagram of modules of a mobile communication system according to an embodiment of the present invention, which includes: a base station controller 5, configured for generating orthogonal sequences, and allocate orthogonal sequences to base stations in a cellular network according to a predetermined method; and a plurality of base stations 6, arranged to form the cellular network, and configured for allocating channels according to the orthogonal sequences. The predetermined method/algorithm includes: causing sequences in each of cells to be orthogonal with one another, and the sequence sets of neighboring ones of the cells to be orthogonal with each other. An orthogonal multiplexing distance of the neighboring ones of the cells is $\sqrt{21}$.

In a specific embodiment, the base station includes: a base station transceiver and an antenna. The transceiver is configured for converting the communication data into a radio frequency signal and then sending by the antenna or for converting a radio frequency signal received by the antenna into communication data.

Based on the above definition of embodiment 2, referring to FIG. 7, FIG. 7 is a flowchart of generating orthogonal sequences according to an embodiment of the present invention, which includes: selecting an m-input and k-output vector semi-bent function, wherein m and k are positive integers, and m=2k+2; and constructing, by using the vector semi-bent function, $3 \times 2^k$ orthogonal sequence sets, wherein in the orthogonal sequence sets, the number of sequences of each of $2^k$ orthogonal sequence sets is $2^{m-1}$, and the number of sequences of each of $2^{k+1}$ orthogonal sequence sets is $2^{m-2}$.

In a specific embodiment, constructing $3 \times 2^k$ orthogonal sequence sets by using the vector semi-bent function includes: obtaining $2^k$ semi-bent functions according to the vector semi-bent function; selecting a $2^m \times 2^m$ dimensional Hadamard matrix and dividing the Hadamard matrix into a first subsequence set, a second subsequence set, and a third subsequence set, wherein the number of sequences of the first subsequence set is $2^{m-1}$, and the number of sequences of each of the second subsequence set and the third subsequence set is $2^{m-2}$; and multiplying corresponding bits of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein the number of sequences of each of the first orthogonal sequence sets is $2^{m-1}$, and the number of sequences of each of the second orthogonal sequence sets as well as the number of sequences of each of the third orthogonal sequence sets is $2^{m-2}$.

The mobile communication system according to the present invention selects specific input and output, and constructs a corresponding number of orthogonal sequence sets by using a semi-bent function, so as to improve the number of the sequences allocated to the cell, and solve the problem that the excessive users cannot communicate normally.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A channel frequency-spreading device for a code division multiple access (CDMA) system, comprising:
   a processor;
   a memory coupled to the processor and configured to store instructions, wherein the processor, when executing the instructions, is configured to:
   generate orthogonal sequence sets, wherein generating the orthogonal sequence sets further comprises:
      select an m-input and k-output vector semi-bent function, where m and k are both positive integers and m=2k+2;
      obtain $2^k$ semi-bent functions according to the vector semi-bent function;
      construct $3 \times 2^k$ orthogonal sequence sets by using the vector semi-bent function, such that in the orthogonal sequence sets, a number of sequences of each of $2^k$ orthogonal sequence sets is $2^{m-1}$, and a number of sequences of each of $2^{k+1}$ orthogonal sequence sets is $2^{m-2}$; and
      arrange cells for the orthogonal sequence sets according to a predetermined rule, so that sequences in each of the cells are orthogonal with one another, and sequence sets of neighboring ones of the cells are orthogonal with each other;
   store the orthogonal sequence sets in storage memory;
   read available orthogonal sequences from the stored orthogonal sequence sets when receiving a user request control signal; and
   receive user request data;
   perform frequency spreading on the user request data according to the available orthogonal sequences; and
   output frequency spread user request data for transmission.

2. The channel frequency-spreading device for a CDMA system according to claim 1, wherein an orthogonal multiplexing distance of the neighboring ones of the cells is $\sqrt{21}$.

3. The channel frequency-spreading device for a CDMA system according to claim 1, wherein the instruction for further cause the processor to:
   select a $2^m \times 2^m$ dimensional Hadamard matrix and divide the Hadamard matrix into a first subsequence set, a second subsequence set, and a third subsequence set, wherein a number of sequences of the first subsequence set is $2^{m-1}$, and a number of sequences of each of the second subsequence set and the third subsequence set is $2^{m-2}$ and
   multiply corresponding bits of each of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of each of the third orthogonal sequence sets is $2^{m-2}$.

4. A channel frequency spreading method for a CDMA system, comprising:
generating orthogonal sequence sets, wherein generating the orthogonal sequence sets further comprises:
selecting an m-input and k-output vector semi-bent function, where m and k are both positive integers and m=2k+2;
obtaining $2^k$ semi-bent functions according to the vector semi-bent function;
constructing $3 \times 2^k$ orthogonal sequence sets by using the vector semi-bent function, such that in the orthogonal sequence sets, a number of sequences of each of $2^k$ orthogonal sequence sets is 2 m$^{-1}$, and a number of sequences of each of $2^{k+1}$ orthogonal sequence sets is 2 m$^{-2}$; and
arranging cells for the orthogonal sequence sets according to a predetermined rule, so that sequences in each of the cells are orthogonal with one another, and sequence sets of neighboring ones of the cells are orthogonal with each other;
storing the orthogonal sequence sets in storage memory;
reading available orthogonal sequences from the stored orthogonal sequence sets when receiving a user request control signal; and
receiving user request data;
performing frequency spreading on the user request data according to the available orthogonal sequences; and
outputting frequency spread user request data for transmission.

5. The channel frequency spreading method for a CDMA system according to claim 4,
wherein the step of constructing $3 \times 2^k$ orthogonal sequence sets further comprises:
selecting a $2^m \times 2^m$ dimensional Hadamard matrix and divide the Hadamard matrix into a first subsequence set, a second subsequence set, and a third subsequence set, wherein a number of sequences of the first subsequence set is 2 m$^{-1}$, and a number of sequences of each of the second subsequence set and the third subsequence set is $2^{m-2}$; and
multiplying corresponding bits of each of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of each of the third orthogonal sequence sets is $2^{m-2}$.

6. The channel frequency spreading method for a CDMA system according to claim 4, wherein an orthogonal multiplexing distance of the neighboring ones of the cells is $\sqrt{21}$.

7. A mobile communication system, comprising:
a plurality of base stations arranged to form a cellular network, wherein each base station comprises a base station controller, a base station transceiver and an antenna, wherein the transceiver is configured to convert the communication data into a radio frequency signal and transmit using the antenna or to converting a radio frequency signal received by the antenna into communication data;
wherein the base station controller is configured to:
generate orthogonal sequence sets and assign each sequence of the sequence set to each of the plurality of base stations according to a predetermined method, wherein each of the plurality of base station allocates channels according to the orthogonal sequences, wherein generating the orthogonal sequence sets further comprises:
selecting an m-input and k-output vector semi-bent function, where m and k are both positive integers and m=2k+2;
obtaining $2^k$ semi-bent functions according to the vector semi-bent function;
constructing $3 \times 2^k$ orthogonal sequence sets by using the vector semi-bent function, such that in the orthogonal sequence sets, a number of sequences of each of $2^k$ orthogonal sequence sets is $2^{m-1}$, and a number of sequences of each of $2^{k+1}$ orthogonal sequence sets is $2^{m-2}$; and
arranging cells for the orthogonal sequence sets according to a predetermined rule, so that sequences in each of the cells are orthogonal with one another, and sequence sets of neighboring ones of the cells are orthogonal with each other;
storing the orthogonal sequence sets in storage memory;
reading available orthogonal sequences from the stored orthogonal sequence sets when receiving a user request control signal; and
receiving user request data;
performing frequency spreading on the user request data according to the available orthogonal sequences; and
outputting frequency spread user request data for transmission.

8. The mobile communication system according to claim 7,
wherein constructing $3 \times 2^k$ orthogonal sequence sets further comprises:
selecting a $2^m \times 2^m$ dimensional Hadamard matrix and divide the Hadamard matrix into a first subsequence set, a second subsequence set, and a third subsequence set, wherein a number of sequences of the first subsequence set is $2^{m-1}$, and a number of sequences of each of the second subsequence set and the third subsequence set is $2^{m-2}$; and
multiplying corresponding bits of each of the $2^k$ semi-bent functions by corresponding bits of the first subsequence set, corresponding bits of the second subsequence set, and corresponding bits of the third subsequence set individually to obtain $2^k$ first orthogonal sequence sets, $2^k$ second orthogonal sequence sets, and $2^k$ third orthogonal sequence sets, wherein a number of sequences of each of the first orthogonal sequence sets is $2^{m-1}$, and a number of sequences of each of the second orthogonal sequence sets as well as a number of each of the third orthogonal sequence sets is $2^{m-2}$.

9. The mobile communication system according to claim 7, wherein an orthogonal multiplexing distance of the neighboring ones of the cells is $\sqrt{21}$.

* * * * *